UNITED STATES PATENT OFFICE.

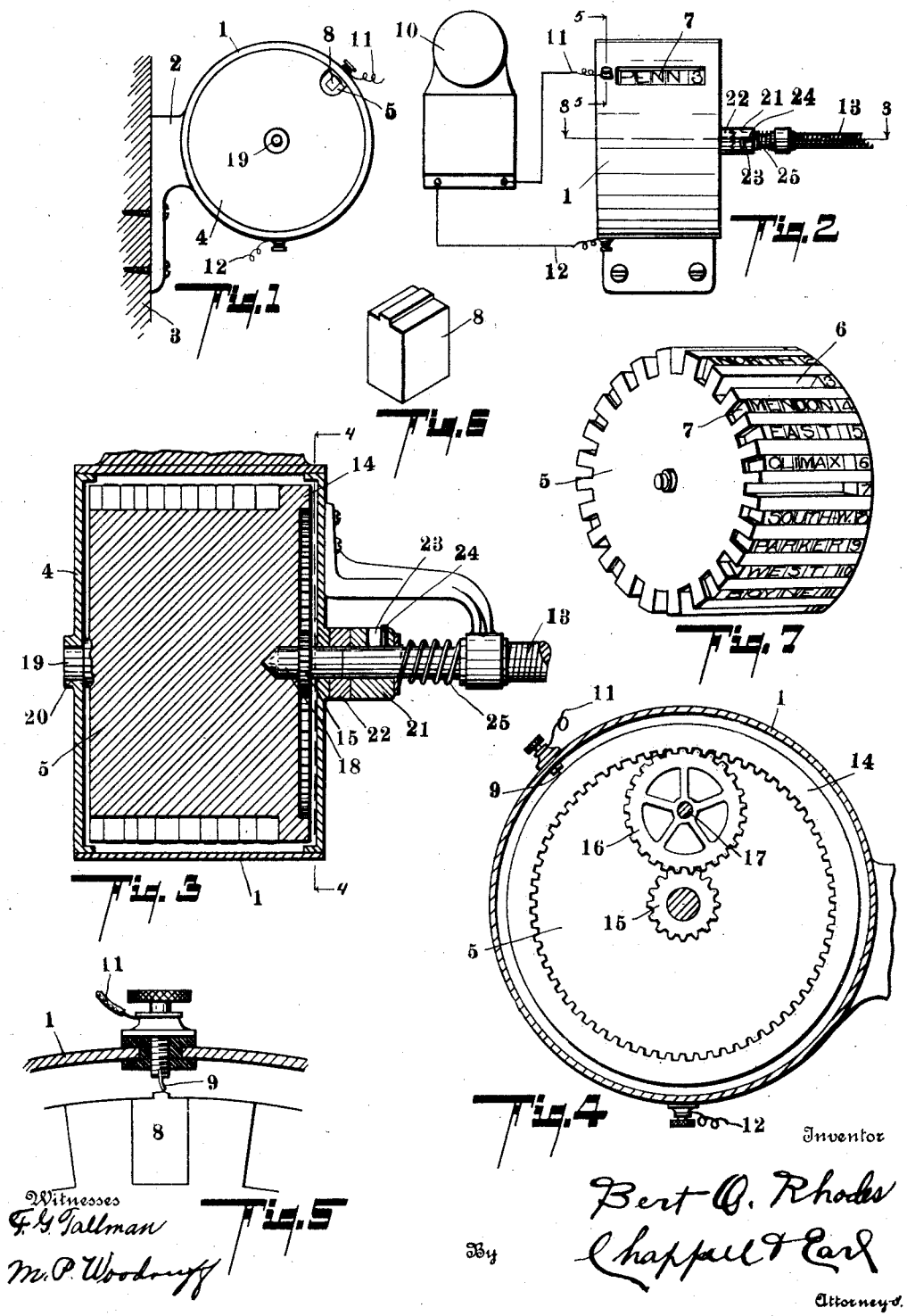

BERT O. RHODES, OF KALAMAZOO, MICHIGAN, ASSIGNOR TO JAY B. RHODES, OF KALAMAZOO, MICHIGAN.

ROUTE-INDICATOR.

1,010,802.  Specification of Letters Patent.  Patented Dec. 5, 1911.

Application filed March 15, 1909. Serial No. 483,446.

*To all whom it may concern:*

Be it known that I, BERT O. RHODES, a citizen of the United States, residing at the city of Kalamazoo, Kalamazoo county, State of Michigan, have invented certain new and useful Improvements in Route-Indicators, of which the following is a specification.

This invention relates to improvements in route indicators.

My present invention is a modification of, and, in some respects, an improvement upon the structure illustrated in my application for Letters Patent filed October 12, 1908, Serial No. 457,340.

The main objects of this invention are: First, to provide a combination odometer and guide device or route director. Second, to provide a guide device or route indicator for use in vehicles by which the route to a given place may be accurately laid out and the directions given to a proper place. Third, to provide an improved route director for moving vehicles by which the name of a place to which the vehicle is passing is displayed. Fourth, to provide an improved route director for moving vehicles by which a signal is given at predetermined intervals to attract the attention of the driver.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which:

Figure 1 is an end elevation of a structure embodying the features of my invention. Fig. 2 is a front elevation thereof, the driving shaft being shown in detail. Fig. 3 is an enlarged detail horizontal section, taken on a line corresponding to line 3—3 of Fig. 2. Fig. 4 is a vertical section, taken on a line corresponding to line 4—4 of Fig. 3. Fig. 5 is an enlarged detail taken on a line corresponding to line 5—5 of Fig. 2. Fig. 6 is a perspective view of one of the adjustable contact members. Fig. 7 is a perspective view of the number wheel removed from the casing.

In the drawing, similar reference characters refer to similar parts throughout the several views, and the sectional views are taken looking in the direction of the little arrows at the ends of the section lines.

Referring to the drawing, the casing 1 of the structure illustrated is provided with a bracket 2 by which it is secured to a suitable support 3, as the dash of a motor vehicle. The casing 1 is provided with a removable end 4, which is adapted to be removed to permit the removal of the number wheel 5. The number wheel is provided at one end with a series of numerals, and has peripheral grooves 6 alined with the numerals, the grooves being adapted to receive the character blocks 7 by means of which a place or a direction may be indicated to designate the route or the particular place in which the vehicle may be.

The number wheel shown in Fig. 7 illustrates the assembling of the route indicia in combination with the distance numerals of the number wheel. With the route as there laid out, the driver of the vehicle is directed to turn to the north when the odometer registers two miles; the vehicle is passing through Mendon when it registers four; a turn should be made to the east when it registers five; the vehicle is passing through Climax when it registers six; a turn to the southwest should be made when it registers eight; the vehicle is passing through Parker when it registers nine; a turn to the west should be made when it registers ten; and the vehicle is passing through Boyne when the odometer registers eleven.

The route is laid out from any starting point, it being intended with the embodiment of my inventions here illustrated that a plurality of cylinders shall be provided if a route or course should cover more territory than is possible to lay out on one cylinder.

To call the attention of the driver to the fact that a turn should be made, or that a point indicated in the route has been reached, I provide a signal which is automatically-actuated through the odometer. This, in the structure illustrated, consists of a plurality of contact members 8, which are adapted to be inserted into the ends of the grooves or holders 6. As the number wheel is revolved, these contact members engage the fixed contact member 9, which is mounted on the casing—see Fig. 5,—and is connected to the bell 10 by the wires 11 and 12. The contact members 8 are adjusted according to the route indicia, so that the signal is given only in connection with the same.

The number wheel is suitably driven as through the shaft 13, adapted to be connected to one of the vehicle wheels. As these connections are common with odometers I do not illustrate the same herein. The shaft 13 is connected to the number wheel by providing the number wheel with an internal gear 14, which is connected to the pinion 15 on the shaft by the means of the intermediate pinion 16, the bearing 17 of which is mounted on the casing. The number wheel is provided with a bearing 18 at one end to receive the end of the driving shaft which forms a support therefor and with a journal 19 at the other end which is supported by a bearing 20 in the removable end 4 of the casing.

To provide means for disconnecting the number wheel from the driving shaft, the driving shaft is preferably made up of sections, the sections being connected by clutch members 21 and 22, the member 21 being fixed to one section and the member 22 being slidably mounted on the other section and provided with a bayonet joint slot 23 to engage the pin 24 so that the member 21 can be locked out of its engaging position. The spring 25 holds it in its engaging position when it is released from the pin. The disconnecting of the odometer is of advantage where some side trip is made from the regular route laid out.

My improved route director provides a means for laying out any desired course or route.

I have illustrated and described my invention in a simple form, which is, at the same time, satisfactory. I am, however, aware that it can be greatly varied in structural detail without departing from my invention, and I desire to be understood as claiming the same specifically as illustrated, as well as broadly.

Having thus described my invention, what I claim as new and desire to secure by Letters Patent is:

1. The combination with an odometer having distance indicia, of direction and place indicia each adjustably associated with said distance indicia, whereby different combinations of distance and direction and distance and place indicia may be had to indicate courses or routes.

2. The combination with an odometer having distance indicia, of direction indicia adjustably associated with said distance indicia, whereby different combinations of distance and direction indicia may be provided to indicate courses or routes.

3. The combination of distance indicating means comprising distance indicia, and route indicia adjustably associated therewith to provide different series of route directions, and means for successively displaying the same.

4. The combination of an odometer having distance indicia and a route indicating means comprising direction and place indicia adjustably associated with said distance indicia so that different combinations of distance and direction or direction and place may be had to indicate different courses or routes, the said indicia being arranged to be successively displayed as the odometer is operated, a signal, a relatively fixed signal member, and a series of coacting signal members adjustably associated with said indicia so that they may be disposed to successively coact with said first mentioned signal member.

5. The combination of an odometer comprising a driven member having distance indicia thereon, route indicia adjustably associated with said distance indicia, whereby different courses or routes may be indicated, an electrically actuated signal comprising a relatively fixed contact member, and a series of adjustable contact members adapted to be arranged on said driven member to correspond to the arrangement of the route indicia, for the purpose specified.

6. In a structure of the class described, the combination with a number wheel having a series of peripheral grooves alined with the numerals of the wheel, route indicia blocks adapted to be inserted in said grooves in said number wheel, a series of contact blocks adapted to be inserted in said grooves, a fixed contact member adapted to successively engage said blocks as said number wheel is revolved, and an electrically-operated signal connected to said contacts.

7. In a structure of the class described, the combination with a number wheel having a series of peripheral grooves alined with the numerals of the wheel, and route indicia blocks adapted to be inserted in said grooves in said number wheel.

8. In a structure of the class described, the combination with a number wheel, route indica adapted to be adjustably arranged on said number wheel, a series of contact members adjustably mounted on said number wheel, a fixed contact member adapted to successively engage the contact member of said series, as said number wheel is revolved, and an electrically-operated signal connected to said contacts.

9. In a structure of the class described, the combination with a number wheel, of place and direction indicia adjustably arranged on said number wheel, whereby different combinations of distance and place and direction may be had.

10. In a structure of the class described, the combination with an odometer comprising a number wheel, of a signal; a plurality of contact members adjustably connected to said number wheel; a fixed contact member adapted to successively engage said number wheel contact members as said number wheel is revolved; and direction and place indicia adjustably associated with said number wheel whereby different combinations of distance and place and direction may be had.

11. The combination of an odometer comprising a driven member having distance indicia and route indicia adjustably associated therewith to provide different series of route directions; means for successively displaying the same, a signal, a relatively fixed signal member, and coacting signal members adjustably associated with said route indicia so that they may be adjusted to coact successively with said first mentioned signal member.

12. In an odometer, the combination of a driven member, a series of route indicia carried thereby said route indicia being adjustable to provide different series of route directions adapted to be successively displayed, a signal, a relatively fixed signal member, and a series of coacting signal members adjustably arranged on said driven member so that they may be disposed to successively coact with said first mentioned signal member as the route indicia are successively displayed.

13. The combination with an odometer comprising a driven member, a series of route indicia adjustably associated with said driven member to provide different series of route directions, a signal, a relatively fixed signal member, and a series of coacting signal members adjustably arranged on said driven member so that they may be arranged to coact successively with said first mentioned signal member as the route indicia are successively displayed.

14. In a structure of the class described, the combination of a driven indicia member, a signal, a relatively fixed signal member, and a series of signal members adjustably disposed on said indicia member, said indicia member being provided with holders for said signal members disposed so that the signal members may be arranged in alinement with said indicia to coact successively with said first mentioned signal member as said indicia member is driven.

15. In a device of the class described, the combination of a wheel having distance indicia thereon, route indicia associated with said distance indicia to provide a series of successively displayed route directions, a signal, a relatively fixed signal member, and a series of coacting signal members adjustably arranged on said wheel, said wheel being provided with locating portions for said signal members in alinement with the distance indicia of said wheel so that said signal members may be disposed to coact successively with said relatively fixed signal members as the route directions are successively displayed.

16. The combination with an odometer comprising a driven member having distance indicia thereon, direction indicia associated with said distance indicia, said direction indicia being adjustably disposed on said driven member to provide different series of route directions, said route directions being adapted to be successively displayed, a signal, a relatively fixed signal member, and coacting signal members associated with said route indicia, said last mentioned signal members being adapted to be adjustably disposed on said driven member to coact with said relatively fixed signal member as the successive route indicia of the different series are displayed.

In witness whereof, I have hereunto set my hand and seal in the presence of two witnesses.

BERT O. RHODES. [L. S.]

Witnesses:
CLARA E. BRADEN,
FRANCES GERTRUDE TALLMAN.

---

Copies of this patent may be obtained for five cents each, by addressing the "Commissioner of Patents, Washington, D. C."